United States Patent
Mollett et al.

(10) Patent No.: US 6,505,772 B1
(45) Date of Patent: Jan. 14, 2003

(54) SYSTEM FOR UTILIZING A SINGLE CARD TO PROVIDE MULTIPLE SERVICES IN AN OPEN NETWORK ENVIRONMENT

(75) Inventors: Cassandra J. Mollett, Houston, TX (US); Melanie Schmutz-Nugent, Humble, TX (US); Judith McGuire, Houston, TX (US)

(73) Assignee: First Data Corporation, Hackensack, NJ (US)

( * ) Notice: Subject to any disclaimer, the term of this patent is extended or adjusted under 35 U.S.C. 154(b) by 0 days.

(21) Appl. No.: 09/599,704

(22) Filed: Jun. 22, 2000

(51) Int. Cl.[7] .............................................. G06F 17/60
(52) U.S. Cl. ....................... 235/379; 235/380
(58) Field of Search ................. 235/379, 380, 235/381; 705/5, 30

(56) References Cited

U.S. PATENT DOCUMENTS

| | | |
|---|---|---|
| 4,367,402 A | 1/1983 | Giraud et al. |
| 4,700,055 A | 10/1987 | Kashkashian, Jr. |
| 5,256,863 A | 10/1993 | Ferguson et al. |
| 5,276,311 A | 1/1994 | Hennige |
| 5,500,513 A | 3/1996 | Langhans et al. |
| 5,530,232 A | 6/1996 | Taylor |
| 5,544,246 A | 8/1996 | Mandelbaum et al. |
| 5,559,312 A | 9/1996 | Lucero |
| 5,566,327 A * | 10/1996 | Sehr ........................... 395/600 |
| 5,649,118 A | 7/1997 | Carlisle et al. |
| 5,710,889 A * | 1/1998 | Clark et al. .................. 395/244 |
| 5,735,742 A | 4/1998 | French |
| 5,748,908 A | 5/1998 | Yu |
| 5,869,826 A * | 2/1999 | Eleftheriou .................. 235/380 |
| 5,870,456 A | 2/1999 | Rogers |
| 5,902,983 A | 5/1999 | Crevelt et al. |
| 5,953,710 A | 9/1999 | Fleming |
| 6,003,764 A | 12/1999 | De Rooij et al. |
| 6,056,194 A * | 5/2000 | Kolls .......................... 235/381 |
| 6,126,069 A | 10/2000 | Stiefel et al. |
| 6,158,657 A * | 12/2000 | Hall, III et al. ............. 235/380 |

OTHER PUBLICATIONS

"Movement For The Use Of Smart Cards In A Linux Environment", "History and Background Information", Jan. 26, 2000, 11:16 a.m.; pp. 1–3; http://linuxnet.com/information.html.

"Movement For The Use Of Smart Cards In A Linux Environment", "Smart Card Tutorial", Jan. 26, 2000, 11:17 a.m.; pp. 1–7; http://linuxnet.com/tutorial.html.

"Biometric Solutions: Minutiae Based Fingerprint Matching", Jan. 26, 2000, 11:32 a.m.; pp. 1–2; http://www.identicator.com/bio_solutions/index.html.

(List continued on next page.)

Primary Examiner—Karl D. Frech
Assistant Examiner—Lisa M. Caputo
(74) Attorney, Agent, or Firm—Brooks & Kushman P.C.

(57) ABSTRACT

An information management system for operation in a proprietary environment implementing a multi-purpose card held by a designated individual. The information management system includes a multi-purpose card, at least one data input device, at least one database, a host, and a transaction processor. The card is coded to identify the rightful cardholder and to identify the services the card holder is entitled to receive. The at least one data input device receives transactional information from the merchant/service-provider and the card. The database records transactional information and verifies transactional information. The host includes the at least one database for processing transactional information. The debit transaction processor authorizes ACH or debit transactions occurring within the proprietary environment. The ACH or debit transaction processor then communicates with the host and at least one financial institution through a network.

10 Claims, 4 Drawing Sheets

OTHER PUBLICATIONS

Michael Kanellos—Staff Writer, CNET News.com, "Canadian bank Invests In Smart Cards", Jun. 24, 1997, 6:10 p.m. PT, Jan. 26, 2000 11:35 a.m., pp. 1–3; http://news.cnet.com/news/0–1003–200–320022.html?st.ne.fd.mdh.

Reuters—Special to CNET News.com, "MasterCard Pushing Smart Cards In Asia", Oct. 8, 1997, 8:45 a.m. PT, Jan. 26, 2000, 11:36 a.m.; pp. 1–3; http://news.cnet.com/news/0–1003–200–322844.html?st.ne.fd.mdh.

"How The Technology Works"; ©1999, Mondex International Ltd.—A Subsidiary Of MasterCard International; Jan. 26, 2000, 12:59 p.m., p. 1; httpL..www,mondex.com/mondex/cgi–bin/pri...name=../documents/tech1.txt& doctype=genp.

* cited by examiner

SYSTEM FOR UTILIZING A SINGLE CARD TO PROVIDE MULTIPLE SERVICES IN AN OPEN NETWORK ENVIRONMENT

TECHNICAL FIELD

This invention relates to an open network tracking and routing system which implements a multi-purpose card.

BACKGROUND ART

The entertainment/amusement industry has made several attempts to accommodate its guests or clientele. These efforts have led to the development of a closed network proprietary card system where a guest may register for a magnetic stripe card or a smart card and obtain a variety of goods and services with the card. For example, the closed network system may allow a guest to carry a single card to: (1) gain admission to amusement park(s)/casino(s); (2) gain entry to his or her hotel room; and (3) purchase food/clothing/gift items at a variety of stores on the issuer's property.

There are generally two types of proprietary cards used in this setting. The first type of card is the magnetic stripe card. The magnetic stripe card operates by encoding information on magnetic tape similar to how a computer writes information onto a floppy disk. This type of card uses a one way authentication method. The card passes its information to a data input device which may be a point of service terminal. The point of service terminal may verify that the requisite information exists either at the point of service terminal or at a database off-site. The second type of proprietary card is a smart card. Smart cards are rarely implemented in the United States due to the reliable communications systems in this country. Rather, smart cards are generally more prevalent in foreign countries where information must be processed at the point of service terminal. The smart card differs from the magnetic stripe card in that it is an integrated circuit card or a plastic card with a small microcomputer "chip" embedded in it. The microcomputer embedded in the card may be programmed to function as an "electronic purse." The electronic purse may be loaded with a value where the value is stored until it is used as payment for goods or services at retailers or service outlets.

Generally, the closed network system of the prior art requires the guest to have his or her credit card authorized up to a certain amount so that the value may be transferred to the proprietary card. The card issuer (i.e. Amusement Park, Casino/Hotel, Airline, Department Store, etc.) then adds value to the proprietary card periodically throughout the guest's stay by obtaining authorization for additional amounts. The guest therefore is required to own a credit card in order to use the closed network system. Also, under the present system, the card issuer does not implement any means of monitoring the guest's spending habits for purposes of future marketing.

As described by U.S. Pat. No. 5,566,327, smart cards of the closed network system have a shape similar to plastic bankcards but with silicon chips and software embedded into the card package. The card may be capable of identifying the rightful cardholder and guarantee the eligibility of that particular visitor to receive the appropriate services and/or products that are stored into the guest card. By implementing the cards as pocket-sized computers, visitors' cards are allowed to operate within a stand alone system, fully integrated system environments, or both as well as proprietary, incompatible system platforms. Similarly, U.S. Pat. No. 5,649,118, issued to Reid et al.; U.S. Pat. No. 5,566,327 issued to Sehr; and U.S. Pat. No. 5,256,863, issued to William et al., disclose systems which implement smart cards that facilitate payment transactions.

U.S. Pat. No. 5,566,327, issued Oct. 15, 1996 to Richard Sehr, describes a computerized theme park information management system which is employed in a closed network environment. The invention disclosed in the '327 patent is intended to provide the guest with a multi-service card which monitors admission to the game park and analyzes the guest's buying behavior by employing smart card technology. However, unlike the present invention, the invention described in the '327 patent is intended for use in a closed network system. There is no direct access to the user's financial institution using the smart card enabling the user to make purchases with the smart card as if it were a debit or ACH card in addition to a room key, admission card, tracking card, etc. Therefore, a user of the Sehr card does not have direct access to his or her checking account, and therefore, must carry a debit card or checkbook in addition to the smart card.

U.S. Pat. No. 5,559,312, issued Sep. 24, 1996 to James Lucero ("Lucero"), discloses a gaming machine system operable with a general purpose charge card. The invention disclosed in the '312 patent allows players to obtain playing credit with a general purpose charge card which updates an individual's account for wins, losses and draws from games of chance played at one or more machines or at tables at one or more casinos.

However, unlike the present invention, the prior art for gaming systems is limited to an environment where the card's implementation is limited to tracking games played at machines or tables and is not usable to gain entry into one's room or to pay for goods and services at retail establishments. Nor do the prior art systems collect data that can be used in predicting the consumer's buying patterns. Furthermore, the prior art systems do not allow users to directly access their checking accounts in the proprietary setting.

Consequently, a need has developed for a system which allows guests the flexibility to access their bank accounts for obtaining a variety of goods and services in a proprietary setting such as an amusement resort, casino, department store, or airline purchasing environment in which the guest's spending habits are also tracked for purposes of future marketing.

DISCLOSURE OF INVENTION

The present invention includes an open network system in cooperation with a multi-service card ("multi-purpose card") that provides a variety of services. The services include any combination of the following, but are not limited to: (1) controlling access to one's room; (2) guest tracking/point accumulation and redemption for the issuing casino hotel or resort; (3) a debit card to pay for purchases within and outside the hotel/casino restaurants and shops; (4) purchasing gaming chips; (5) obtaining cash at a casino cashier or hotel desk; (6) accessing a variety of theme parks and restaurants; and (7) purchasing airline tickets, accumulating points for airline tickets, and redeeming points for airline tickets. Furthermore, the information gathered from the use of the multi-purpose card may be manipulated to better understand the buying trends of the individual user.

Information gathered by the multi-purpose card may be used in targeted marketing of goods and services to individuals, thereby obviating the high cost of mass mailings of varied goods and services to a non-targeted consumer population. The invention also gives the carrier of the multi-purpose card greater freedom to travel lightly. Instead of guests carrying keys, checkbooks, pocketbooks, debit cards, player tracking/point accumulation cards and redemption cards from the issuing casino/hotel or resort, a single card in the form of the magnetic stripe card or smart card replaces all the items listed thereby allowing for lighter, carefree movement. In addition, the multi-purpose card improves security since the holder of the card is the only person able to use the card. Further, it significantly decreases incidences of lost pocketbooks or keys that all too often are misplaced or forgotten as one moves between gaming areas or other establishments.

The invention accomplishes this by having a transaction processing system that is able to store a significant volume of transactions, accumulate and process transactional customer information for card verification as well as customer profiles for targeted marketing campaigns. This invention may also utilize existing hotel processes that separately issue keys or player tracking cards and assimilate all these functions with the addition of a debit card facility on a single card.

The present invention is beneficial in that it accumulates data from a plurality of sources, manipulates this data into a form that is useful for targeted marketing campaigns and increases safety in that users of the multi-purpose card are not carrying cash or credit cards which may be subject to theft or fraud.

Thus, this invention provides a novel means for enabling patrons at hotels or casinos to gain access to their rooms, accumulate points and/or track behavior, point redemption, obtaining cash, obtaining chips at a gaming table and making purchases at various shops and restaurants using a single multi-purpose card. The cardholder has the added convenience of having an accurate summation of his charges on his bank statement (similar to a check or debit or credit card transaction). The card issuer (casino/hotel, resort, airline) has the ability to more selectively target consumers based on preferences garnered through use of the multi-purpose card. The benefits of knowing where consumers are spending their dollars have enormous potential to marketers of goods and services as well as to economists.

Accordingly, an object of this invention is to provide the card holder with a single card that can replace a player tracking/point card, a checkbook, a room key and cash. In short, it can substitute for a wallet, pocketbook or multiple cards.

Another object of this invention is to provide a better means of identifying and tracking consumption habits of the card holder in order to achieve a more effective allocation of advertising dollars.

Still another object of the invention is to prevent unauthorized access to rooms by having a security means that identifies authorized card holders. Further, the card also provides a means by which authorized card holders are verified so as to prevent fraudulent purchases.

Another object of this invention is to allow a consumer to directly access his or her checking account for purchases and debit transactions in a proprietary environment.

Another object of this invention is to provide guests at resorts or casinos with a single card that functions as a player tracking/point accumulation and redemption card for the issuing casino/hotel or resort, allows the holder access to his room, allows him to obtain cash from casino cashiers and hotel desks, allows him to purchase goods and service at a variety of vendors inside and outside the resort, and allows the companies servicing these clients and other companies interested in servicing these clients to obtain specific information about the holder's buying habits in order to better market products to a targeted audience.

A more specific object of this invention is to provide an information management system for operation in a proprietary environment implementing a multi-purpose debit card held by a designated individual. The information management system includes a multi-purpose card, a data input device, at least one database, a host, and a transaction processor. The card is coded to identify the rightful cardholder and to identify the services the card holder is entitled to receive. The data input device receives transactional information from the merchant/service-provider and the card. The database records transactional information, verifies transactional information and then forwards the transactional information to the transaction processor. The transaction processor may handle either Automated Clearing House (ACH) transactions or debit transactions. Once transaction processor receives the information, the transaction processor may authorize the debit or ACH transactions occurring within the proprietary environment. The transaction processor then communicates with the host and at least one financial institution through a network.

BEST MODE FOR CARRYING OUT THE INVENTION

The present invention provides a system and method for facilitating a number of different transactions using a single card. Such transactions may include any combination of the following: purchasing goods and services at a variety of vendors, acting as a checkbook, purchasing gaming chips, purchasing airline tickets, gaining access to one's room, obtaining cash and player tracking/point card; gaining admission to a variety of amusement parks; and purchasing meals at a restaurant. In short, a single card can substitute for a wallet or pocketbook.

The system and multi-purpose card may be implemented in a variety of ways. As noted, the multi-purpose card of the present invention may be used in proprietary environments such as a casino, amusement park, department store, or airline purchasing system.

Figure 1:
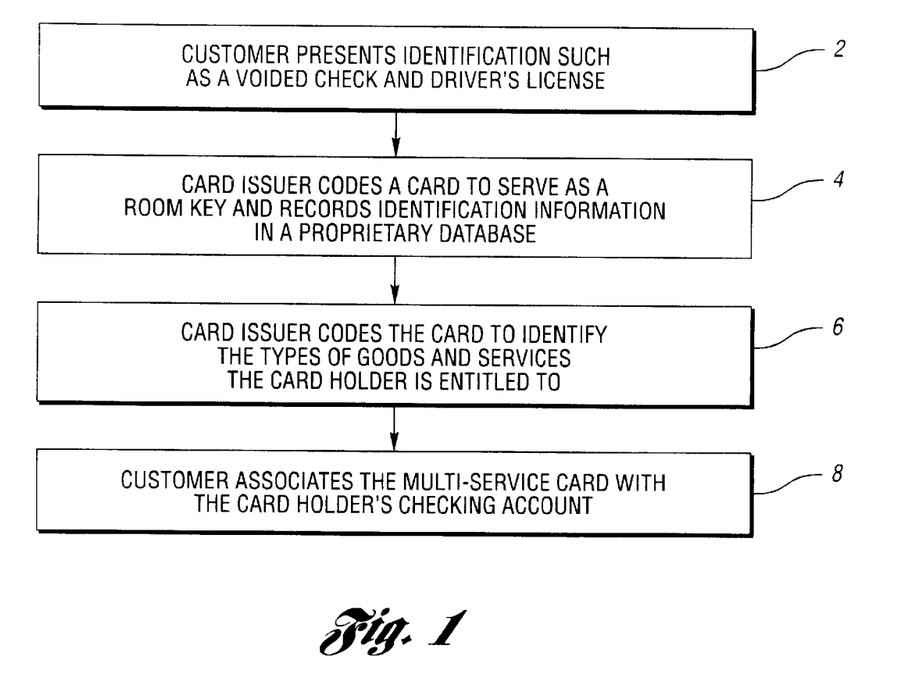
FIG. 1 is a flow chart illustrating the method of activating the multi-purpose card.

FIG. 1 is a flow chart which outlines the general method for registering a guest and issuing a multi-purpose card in a casino environment. First, the customer presents 2 a form of identification such as a drivers license and voided check at check in. Second, the card issuer may code 4 the card as a room key and to record identification information in a database. Third, the multi-purpose card is coded 6 to identify the type of goods and services entitled by the cardholder. Fourth, the card is coded 8 to function as a checkbook. To activate the checkbook aspect of the card, the desk clerk would need to input checking information at a data input device to enable the card to function as a checkbook. For example, the information is taken from a voided check and then transferred to a magnetic stripe card. This information may be electronically transferred to the transaction processor. This information may be stored with the processor or merchant or database management provider. When the card user uses the card for a debit card transaction, transactional information and the multi-purpose card's code is transmitted to the processor and the processor matches the code to the account stored in its database. Once this match occurs, the processor applies the transaction against the corresponding account. Information will be sent from the debit processor to the card issuer to obtain permission to associate the card with the checking account. This card, therefore, will function in part as a means of dispensing electronic checks which are drawn against the account holder's bank account.

The card of the present system may also operate in an open network environment where the user has access to his or her checking account and is in a proprietary setting such as a casino, Disney World, or the like. The proprietary settings such as casinos and Disney World both implement a centralized system having many components which can include any combination of the following: hotels, restaurants, entertainment activities such as rides, amusement parks, and gambling tables/machines. With respect to the casino environment, the issuer of the card tracks the user's spending and gambling habits in the proprietary setting of a casino/restaurant/hotel environment. With respect to the amusement park environment, the issuer of the card tracks the user's spending and amusement park activities. The information gathered may be applied toward the issuer's future marketing campaigns.

The information management system of the present invention allows a user to use the same card for the various components of the proprietary environment by transmitting card usage information to a variety of categorized databases and a transaction processor. The categorized databases reside in the card issuer's proprietary environment. Therefore, in the example of an amusement park system, the park system's host maintains the various databases. The cooperation between the card and the above-referenced databases is known in the art and is described in U.S. Pat. No. 5,566,327 issued to Sehr which is incorporated by reference herein. The Sehr patent teaches a plurality of databases which correlate to appropriate theme park entities (or components of the overall system). The databases contain data records and all appropriate information as well as template files that are needed to implement the system's operational functions, including communications and data security management.

The multi-purpose card is programmed according to the desired services of the particular card user. The issuer may have a database structure which corresponds to the variety of services within a proprietary setting. The visitor's information such as name, address, and dates of validity are loaded onto the card. Subsequently, the payment option is selected where the visitor indicates that payment will occur through the user's checking account. The system may then partition the payment among the variety of selected services by service type.

The user may then use the card to receive services or have access to certain activities. At the data input device, card information is entered into the system. The data may be entered into the system through a variety of ways. For example, the card number may be typed in at a keyboard of a data input device. Another method is to read the card number off the magnetic stripe. The data may be entered into the system by a merchant clerk, card issuer representative, or the card holder himself. The data input device communicates with the card issuer's host to determine whether the guest card is authentic. The data input device accepts the information from the card and matches the information with the information in the issuer's authenticity files residing at the host. If the guest card is not authentic, then the data input device will display a message which reflects this status. If the card is authentic, the data input device asks for the identity of the requested services or products. With respect to the present invention and referring to FIG. 5, the data input device may contain a switch which directs the information to the appropriate database or debit/ACH transaction processor.

Figure 2:
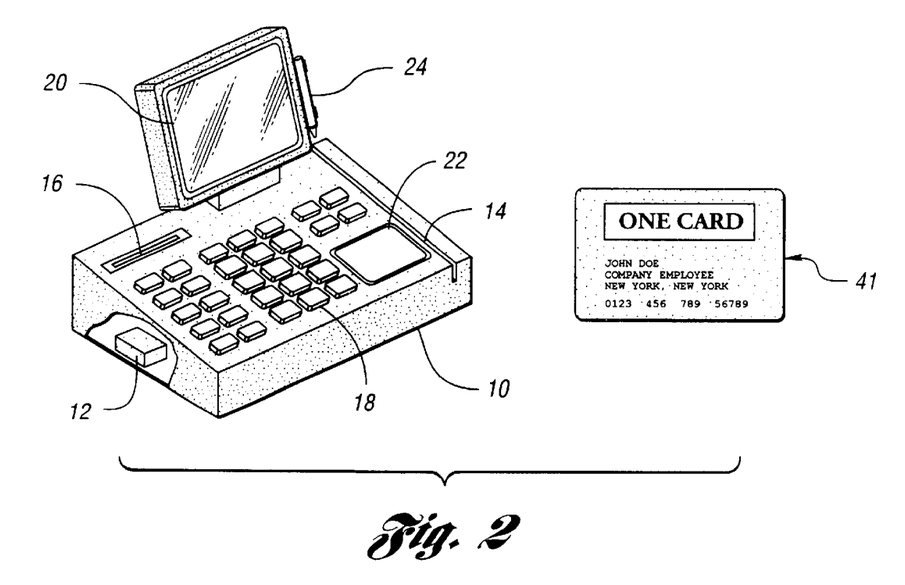
FIG. 2 illustrates a data input device which may be a point of service terminal.

FIG. 2 illustrates a data input device 10 which may be a point of service terminal 10 used for performing transactions with the card according to the present invention. Terminal 10 is used to transmit information to a transaction processor or directly to a financial institution and to obtain authorization from such entities. Terminal 10 may have a central processing unit 12 which determines transaction type routing and peripheral devices which communicate with the processor 12. For example, terminal 10 may include one or more data entry devices such as a card reader 14, check reader 16 and a keypad or keyboard 18. Furthermore, terminal 10 may also include and preferably does include a display unit 20. The card reader 14 is configured to recognize a magnetic stripe to allow the card reader to accommodate other types of charge cards such as credit cards. The keypad or keyboard 18 is configured to receive alpha-numeric data, and maybe provided with an embedded mouse 22. The display unit 20 may have a color screen of the order of 3 inches by 3 inches. Although, it should be noted that other display screens may be used. The screen may be activated by an electronic pen 24.

The data input device 10 may also include or be in communication with a biometrics box which is in communication with the reader to also capture biometrics characteristics such as fingerprints, voice, digital signature, picture or retina of a particular cardholder. Under this scenario, the system can compare the biometrics data with one stored in the databases or guest card.

Figure 3:
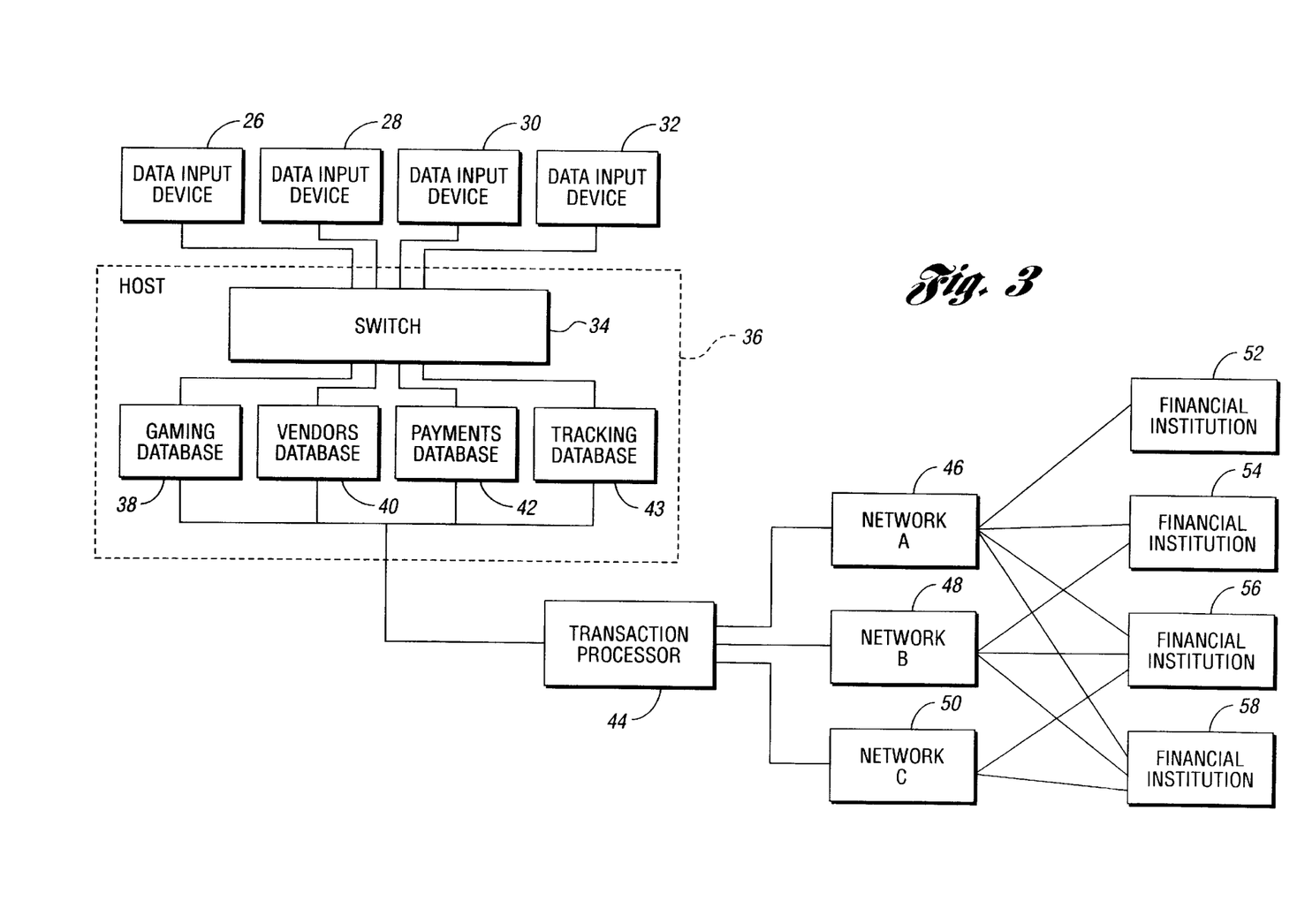
FIG. 3 illustrates a first embodiment of the system of the present invention.

With reference to FIG. 3, a first embodiment of the overall system is illustrated. The data input device 26 may direct the information extracted from the card and the merchant to a switch 34 that resides in the card issuer's host 36. The switch 34 within the card issuer's host 36 then directs the information to the database 38, 40, 42 which corresponds to the transaction. For example, if the transaction relates to a purchase of a toy at a gift store, the information will be directed to a vendors database 40 in which the transactional information may be recorded such as the identity of the card user, the type of transaction, and the merchandise/service information relating to that transaction. In addition to storing the transactional information, the card issuer's host validates the card holder's usage. Given that the purchase of a toy requires the approval of funds, the transactional information is forwarded to a transaction processor 44. The transaction processor 44 then performs a check guarantee/verification process for the merchant. If the transaction is approved by the transaction processor, the transaction processor 44 then returns an authorization signal to the data input device. This authorization signal may be routed directly from the transaction processor 44 to the card issuer's host 36 where the authorization is recorded and then forwarded to the data input device 10. The transaction processor 44 also forwards the information to the appropriate financial institution 52, 54, 56, 58 for debiting the guest's account by routing the data through the appropriate network 46, 48, 50.

Figure 4:
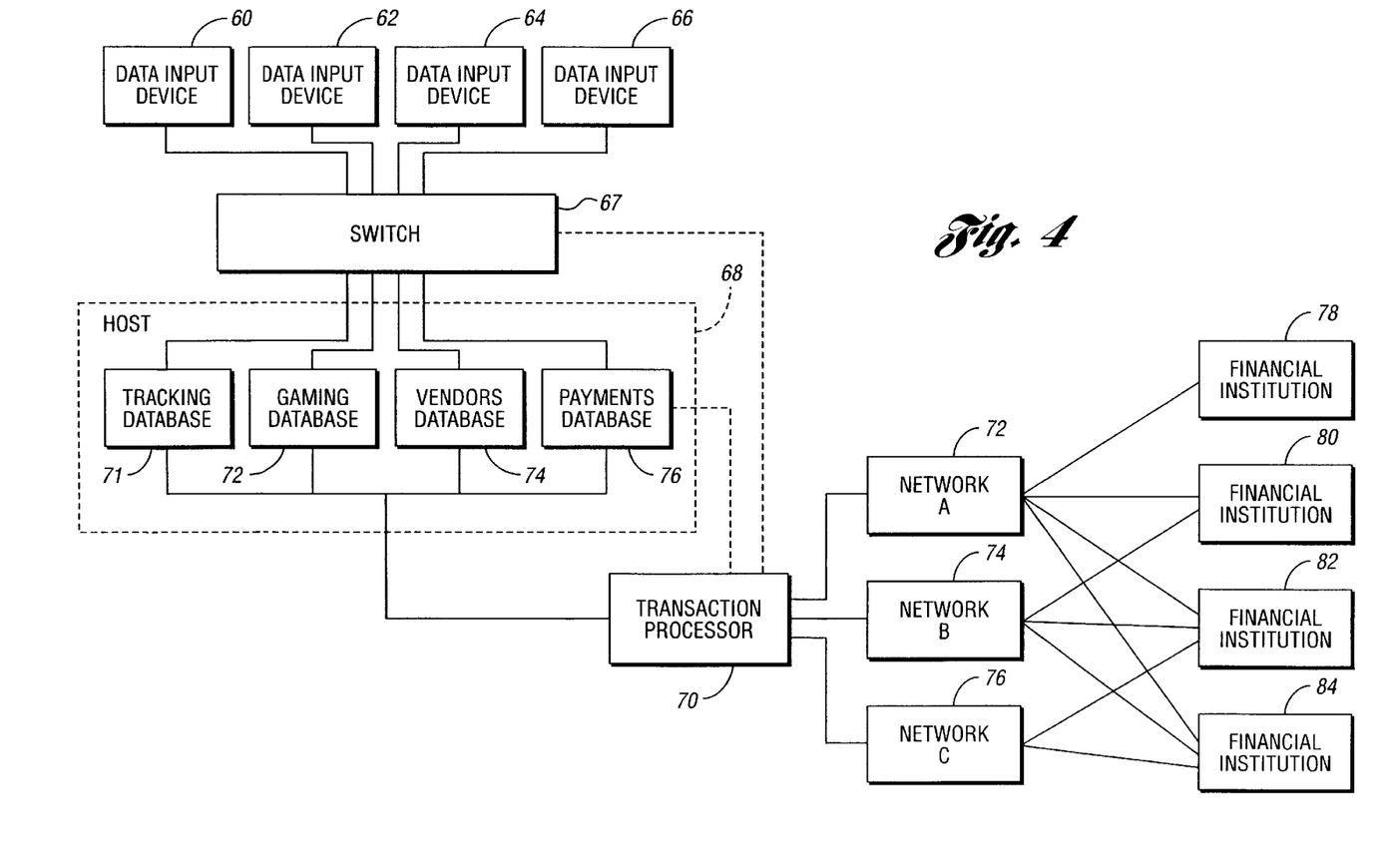
FIG. 4 illustrates a second embodiment of the system of the present invention.

With reference to FIG. 4, a second embodiment of the system of the present invention is illustrated. In this embodiment, the switch 67 neither resides in the data input device 60, 62, 64, 66 nor the host 68. Rather the switch 67 is a separate component and is linked to at least one data input device 60, 62, 64, 66, the issuer's host and the transaction processor 70. In this embodiment, the data input device 60, 62, 64, 66 transfers the transactional information to the switch 67. The switch 67 then determines the type of the transaction and forwards the information to the appropriate destination which may be one of the many categorized databases 72, 74, 76 in the issuer's host 68 or directly o she transaction processor 70. Where the guest intends to gain access to the issuer's facilities such as a gaming table or a hotel room, then the information is sent to the corresponding database 72, 74, 76 (i.e. gaming database 72, accommodations database) to verify that the guest is entitled to gain entry to either the gaming activity or the hotel room. Also, the information regarding the card usage is recorded to monitor the guest's activities. Where the user intends to make a purchase at the issuer's store, the transactional information is transmitted to the vendors database 74 so that the transaction to record the transaction and, then the information is routed to the transaction processor 70 to authorize the transaction through financial institution 78, 80, 82, 84. Similar to the first embodiment, the transaction processor 70 will approve or deny the transaction according to its own scoring method. The transaction processor 70 transmits its approval or denial back to the card issuer's host 68 and switch 67 which, in turn, routes the response to the appropriate data input device 60, 62, 64, 66.

Figure 5:
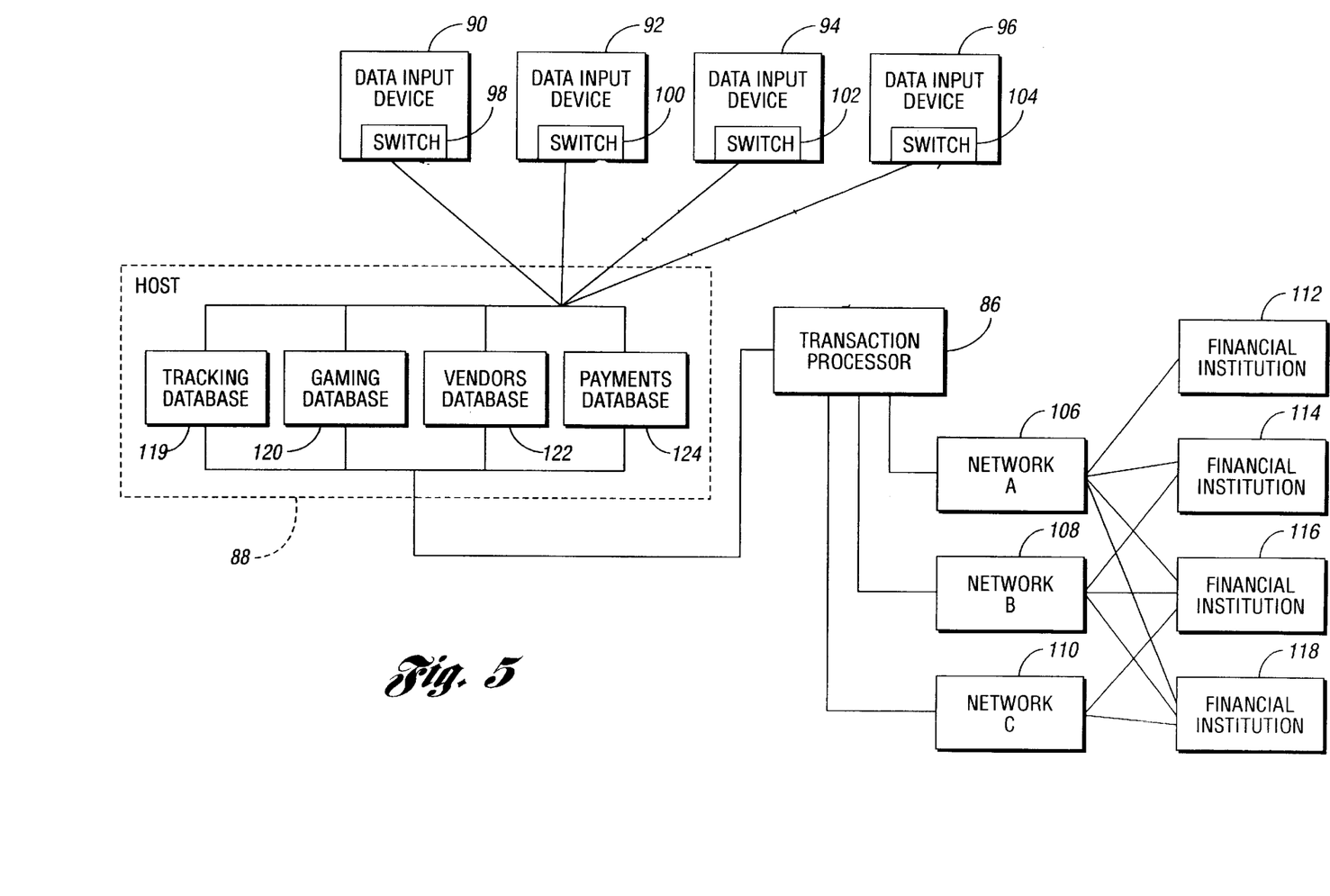
FIG. 5 illustrates a third embodiment of the system of the present invention.

Referring now to FIG. 5, a third embodiment of the present invention is illustrated. In this embodiment, the transaction processor 86 communicates directly with the card issuer's host and the data input devices 90, 92, 94, 96. The data input devices 90, 92, 94, 96 include a switch 98, 100, 102, 104 which routes transactional information to the appropriate location. For example, where the guest seeks to obtain funds, the guest may go to the data input device 90, 92, 94, 96 and request funds. The guest's card is swiped through the data input device's card reader. The request is processed at the switch 98, 100, 102, 104 to determine whether the transaction is for a service/good from the card issuer or whether the transaction is for funds. In the event that the transaction is to obtain funds, the data may be routed directly to the transaction processor 86 which will approve or deny the transaction according to its scoring methods. The transaction processor 86 then routes the information to the appropriate network 106, 108, 110 through which the transaction (i.e. electronic check) is submitted to the appropriate financial institution 112, 114, 116, 118. Where the transaction processor 86 approved the funds and sufficient funds exist in the account, the financial institution 112, 114, 116, 118 will deduct the amount from the individual's checking account.

In the event that the guest seeks services or goods from the card issuer, the transactional information is provided to the data input device 90, 92, 94, 96. The switch 98, 100, 102, 104 at the data input device 90, 92, 94, 96 determines the type of transaction. Where the transaction includes a request of goods or services from the card issuer, the switch 98, 100, 102, 104 transmits the transactional information to the appropriate database 120, 122, 124 in the card issuer's host. The database 120, 122, 124 which corresponds to the type of transaction records the information, and verifies/denies the guest's information. The data is routed to the transaction processor 86 where the transaction requires funds such a purchase of goods or services. Again, the transaction processor 86 will approve or deny the transaction based upon its own scoring methodology and subsequently forward the information to the guest's financial institution. The transaction processor 86 will also transmit a signal which identifies an approval or a denial of funds to the appropriate data input device 90, 92, 94, 96. This signal may either be transmitted directly to the data input device or it may be re-routed through the card issuer's host 88.

At a more detailed level, each embodiment requires determinations at several steps. The first determination is whether the services/products that were requested by the visitor are actually stored in the card. For example, if the visitor wants to gain access to an attraction, the guest card must have the requisite service code which matches the codes at the entrance to the attraction. Where a visitor seeks to purchase merchandise, the cardholder must have sufficient authorized funds. This determination is made at the transaction processor's host 44, 70, 86. In the event that the card entitles the user to receive the requested services or goods, the system will deduct the dollar amounts that are associated with the consumption of the services or products from the user's checking account. In each embodiment, the transactional information is routed to the appropriate categorized database. Once the appropriate verification process has occurred at the categorized database, the transaction information is relayed to the tracking database and the transaction processor. The transaction processor 44, 70, 86 then communicates with the appropriate network in performing the debit transaction. The tracking database 43, 71, 119 stores the transactional information for future use in marketing. By relating these findings to the visitor's demographics data, the issuer can design effective sales promotions and marketing programs. The issuer may also plan its future offerings accordingly. Moreover, the multi-purpose card may be reusable and may be used as a frequent visitors pass upon which bonus points may be allocated to that card and the visitor use those points toward other purchases.

As discussed, included as one of the many databases is a tracking database 43, 71, 119 which may generate reports on a daily basis identifying transactions involving individual card users. The tracking database 43, 71, 119 serve as a central repository of data and can be queried by any of the plurality of databases linked to it or it may be queried at individual service provider hosts/databases. This tracking database 43, 71, 119 further contains several data storage elements in which data relating to an individual's purchasing habits, current account balances, player tracking points, service codes and room entry codes is stored. The database system may also have a means for receiving individual item names, item prices and vendor names for each transaction. The card issuer's host may sort out products purchased by category and adds the prices of each item in individual categories. It further may have a means for differentiating between business types so as to provide the maximum relevant information to vendors of goods and services who wish to perform targeted marketing campaigns. The reports that track user activity and generate the usable marketing data may be created at the server level. Furthermore at the server level, individual activity may be tracked by a query function or tracked at the individual service provider hosts.

Within the databases or accessible to all databases is a data storage structure within which identification information is stored. This may include one or more of the individual's name, address, social security number and Personal Identification Number. It could also include biometric information if so desired.

Within the system of the present invention, at the moment a user attempts to use the card 41, automatic queries will compare the inputted data with data stored in tracking database 43, 71, 119 to prevent unauthorized access to the card. As an alternative, user information may be stored in one or more other databases where the system compares inputted data with one of the categorized databases. For example, in the event of an unauthorized user attempts to use the card, the terminal at which such a transaction is attempted will request a PIN number and if the individual is unable to provide the correct PIN number access to further processing will be denied.

As indicated above, the present invention may be implemented in an airline ticket purchasing environment. The system assists in: (1) tracking the total number of travel points accumulated; (2) redeeming travel points for free airline tickets; and (3) purchasing airline tickets through the cardholder's checking account. In meeting these particularized goals, the multi-purpose card has an account or frequent flyer number associated with the card. In issuing the multi-purpose card, the card issuer or airline company may request drivers license identification information in addition to checking account information. This information may be encoded onto the card in addition to a frequent flyer number. The airline may then associate the drivers license information and the checking account information to the frequent flyer number in a database preferably residing with the airline's host. As the card holder purchases airline tickets with the multi-purpose card, the card holder may indicate that he or she intends to purchase the airline tickets through his or her checking account. The indication may be made by the card holder at a data input device such as a personal computer or kiosk. In the alternative, the indication may be made by an airline representative at a data input device.

Regardless, the transaction information is routed from the data input device 26, 28, 30, 32, 60, 62, 64, 66, 90, 92, 94, 96 to the airline's proprietary database at the host 36, 68, 88 where the purchase is recorded for the purpose, in part, to later issue frequent flyer miles to the card holder. The host, in turn, will include a plurality of databases such as which, as noted above, includes the drivers license information and checking account information. The host tracks the total number of travel points accumulated and further transmits the transactional information to the transacting processor 44, 70, 86. Once the information is recorded, the airline transmits the transactional information to a transaction processor 44, 70, 86. The transaction processor 44, 70, 86 may handle either Automated Clearinghouse Transactions (ACH) or debit transactions. Where the transaction processor 44, 70, 86 is an ACH processor, the transaction processor 44, 70, 86 determines the existence of any risk and whether the purchase should be authorized and if authorized, returns an authorization signal to the data input device 26, 28, 30, 32, 60, 62, 64, 66, 90, 92, 94, 96, so that the transaction may proceed with dispensing the airline ticket or airline ticket number, and recording any corresponding travel points.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An information management system for operation in a proprietary environment visited by a designated cardholder, the system comprising:
    a multi-purpose debit card coded to identify the designated cardholder, to provide access to at least one restricted area, and to identify services the card holder is entitled to receive;
    at least one data input device operative to receive transactional information from a merchant and the card;
    at least one database in communication with the at least one data input device, the at least one database operative to record transactional information and verify transactional information;
    at least one host including the at least one database for processing transactional information; and
    a transaction processor in communication with the at least one host and at least one financial institution through a network, the transaction processor operative to authorize each transaction occurring within the proprietary environment with the at least one financial institution as the transaction occurs.

2. The information management system recited in claim 1 wherein the at least one host and the at least one data input device communicate through a local area network.

3. The information management system recited in claim 1 wherein the card is a magnetic stripe card.

4. The information management system recited in claim 1 wherein the card is a smart card.

5. The information management system recited in claim 1 wherein the at least one host records the transactional information for the cardholder and produces a report for the cardholder for future marketing purposes.

6. The information management system recited in claim 1 wherein the transaction processor is in communication with the at least one data input device.

7. The information management system recited in claim 1 wherein the data input device includes a biometrics box which captures one of the card holder's fingerprints, voice, digital signature, picture or retina of the cardholder, the data input device transmitting the data to the at least one database to match the data to information stored within the database and verify the cardholder.

8. The information management system recited in claim 1 wherein at least one data input device includes a switch for directing transactional information to the host and the appropriate database.

9. The information management system recited in claim 1 further comprising a switch in communication with the at least one data input device and the host, the switch operative to direct transactional information from the data input device to one of the at least one databases.

10. The information management system recited in claim 1 wherein the host includes a switch for directing transactional information received from the at least one data input device to one of the at least one databases.

* * * * *